United States Patent
Mueller et al.

(10) Patent No.: US 6,508,932 B1
(45) Date of Patent: Jan. 21, 2003

(54) FILTER WITH VALVE HAVING A HYDROPHOBIC COATING

(75) Inventors: Heinz Mueller, Remseck (DE); Helmut Storz, Benningen (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/762,203
(22) PCT Filed: Aug. 2, 1999
(86) PCT No.: PCT/EP99/05558
§ 371 (c)(1),
(2), (4) Date: Feb. 5, 2001
(87) PCT Pub. No.: WO00/07693
PCT Pub. Date: Feb. 17, 2000

(30) Foreign Application Priority Data

Aug. 4, 1998 (DE) .......................................... 198 35 212

(51) Int. Cl.[7] ............................................ B01D 35/147
(52) U.S. Cl. ....................... 210/130; 210/136; 210/149; 210/171; 210/184; 210/420; 137/535; 137/802
(58) Field of Search ........................... 210/97, 117, 130, 210/133, 136, 168, 149, 171, 420, 440, 443, 444, 184, 186, 416.4, 416.5; 137/535, 540, 802

(56) References Cited

U.S. PATENT DOCUMENTS

| 4,437,986 A | * | 3/1984 | Hutchins | ..................... 210/130 |
| 5,284,579 A | * | 2/1994 | Covington | ................... 210/130 |
| 5,411,659 A | * | 5/1995 | Niclhols | ..................... 210/130 |

* cited by examiner

Primary Examiner—Joseph W. Drodge
(74) Attorney, Agent, or Firm—Crowell & Moring LLP

(57) ABSTRACT

A filter, especially a filter for lubricating oil of an internal combustion engine, including an inlet for the raw liquid and an outlet for the clean liquid. A filter insert (12) is arranged inside the filter, as well as a valve, such as a pressure relief valve (23). Parts of the valve are provided with coatings, for example hydrophobic coatings of polytetrafluoroethylene or silicone. The filter can also contain a heating element (34) in the vicinity of the valve.

10 Claims, 2 Drawing Sheets

FILTER WITH VALVE HAVING A HYDROPHOBIC COATING

This application is a 371 of PCT/EP99/05558, filed on Aug. 2, 2002.

BACKGROUND OF THE INVENTION

This invention relates to a filter, in particular to a filter for cleaning the lubricating oil of an internal combustion engine.

The lubricating oil of an internal combustion engine under certain operating conditions contains moisture or water. Water or moisture arises in the combustion of the fuel-air mixture and can pass into the oil plan with the blow-by gases. There it is carried with the oil through the oil pump among other things to the oil filter. In particular under unfavorable climatic conditions, i.e., in the event of very low outside temperatures, this water can freeze and occlude a filter element or a valve for a short period of time. As a result, the motor is not adequately supplied with oil during a cold start and therefore it can be destroyed.

Known from DE 42 43 217 is a liquid filter, in particular a lubricating oil filter which has a filter body 13 which can be replaced. Within the filter body, two valves are arranged. The valves are a pressure relief valve and a check valve. Such valves ordinarily comprise a rubber valve member which fits against a metal valve plate. These valves are extremely reliable, but nevertheless there is a danger that under extreme operating conditions, in particular low temperatures, functional disturbances can occur.

Known from JP 5/118 448 is a multifunctional filter in which a high corrosion resistance and a high resistance to wear are intended to be realized. In this filter, there is a valve of polytetrafluoroethylene, which is supposed to have the aforementioned characteristics.

SUMMARY OF THE INVENTION

It is the object of the invention to provide a filter, in particular for cleaning the lubricating oil of an internal combustion engine, whose movable parts are not only non-wearing and corrosion resistant, but also function reliably under extreme operating conditions. This object is achieved by the invention as described and claimed hereinafter.

The substantial advantage of the invention is that a valve arranged in the filter has a valve member which is coated, for example, with polytetrafluoroethylene. In addition, the contact surface of the valve can be coated with polytetrafluoroethylene or another hydrophobic material. It is also possible to manufacture the valve member of silicone or silicone-coated material. At low ambient temperatures at which there is a danger that water which may be present in the filter will form ice, the coating of the valves prevents the valve members and contact surfaces from fusing together. This means that the valve will open immediately during a cold start of the motor even at very low temperatures and in the presence of the formation of ice.

Specifically a coating of metal parts with a hydrophobic material has the advantage that on the one hand, the stability of the valve is ensured and on the other hand the surface of the component is corrosion resistant, low wearing, and functionally reliable.

Alternatively or supplementally to the special configuration of the valve, there is also the possibility of arranging a cold conductor (posistor) element in the area of the valve or in the area of the filter. This cold conductor element, or possibly also a heating head, which is supplied with an appropriate voltage, causes a rapid warming of the valve and thus a thawing of any existing layers of ice so that the valve will be operational immediately following starting of the motor.

It is furthermore advantageous to configure the contact area between valve members and contact surface in such a way that it is minimized. Also through this measure the response behavior of the valve, i.e., the ease of opening and closing at extreme operating conditions is ensured.

These and additional features of advantageous further developments of the invention are found in the description and the drawings as well as in the claims, with it being possible for the individual features to be realized individually or jointly in the form of subcombinations in embodiments of the invention and in other fields and with such features representing advantageous embodiments which can be protected as such and for which protection is claimed here.

BRIEF DESCRIPTION OF THE DRAWINGS

The invention is explained in greater detail below with reference to illustrative embodiments.

DETAILED DESCRIPTION OF PREFERRED EMBODIMENTS

Figure 1:
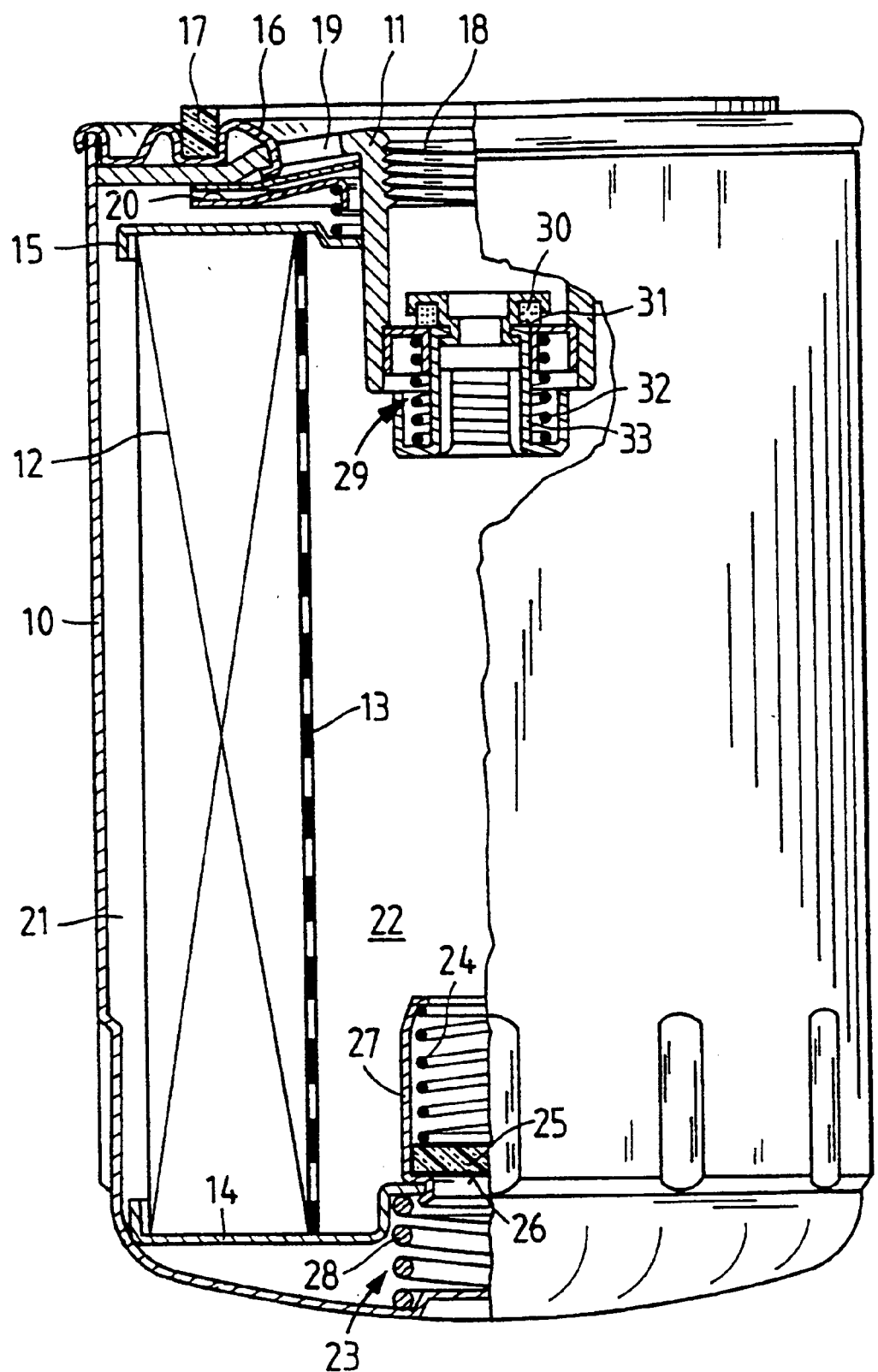
FIG. 1 shows a filter for the lubricating oil of an internal combustion engine.

The filter shown in FIG. 1 comprises a housing 10, a mounting plate 11 and a filter insert 12 arranged in housing 10. The filter insert is a zigzag-shaped, folded filter medium which is arranged on a support tube 13 and has end disks 14, 15 at its end faces.

Housing 10 is crimped to a cover 16. This cover 16 carries a seal 17. The filter is attached via a threaded connection 18 to a support structure not shown here.

The oil to be cleaned flows through opening 19 and a back-flow check valve 20 into the outer area of the filter, flows through filter insert 12 and, having been cleaned, exits the filter via a central outlet through the threaded connection 18.

Between raw oil side 21 and clean oil side 22 there is a pressure relief valve 23. This valve is comprised of a valve spring 24, a valve member 25, a contact surface 26 for the valve member, and a guide 27 for the spring. At certain operating conditions, i.e., during a cold start, the differential pressure between the raw oil side and the clean oil side can increase so strongly that this valve opens and the oil circulation can be maintained. In order for this valve to open reliably, contact surface 26 is coated, for example with polytetrafluoroethylene.

Under appropriate circumstances, valve member 25 may be composed of polytetrafluoroethylene and/or it may likewise be a polytetrafluoroethylene-coated metal plate. Of course, it is also possible to provide a different coating. What is important is that this coating be hydrophobic so that icing by water, which under some circumstances may be found in the area of this valve, does not result in inoperability of the valve.

Filter insert 12 is stabilized in the housing by a compression spring 28. Also provided in the filter insert is a check valve or back-flow blocking valve 29. It likewise comprises a valve member 30, a contact surface 31, a valve spring 32, and a guide 33 for the spring. Also in the case of this valve, the movable parts and/or contact surfaces of these parts are provided with coatings, in particular polytetrafluoroethylene coatings or silicone coatings so that the functionality is assured even in the case of ice formation.

Figure 2:
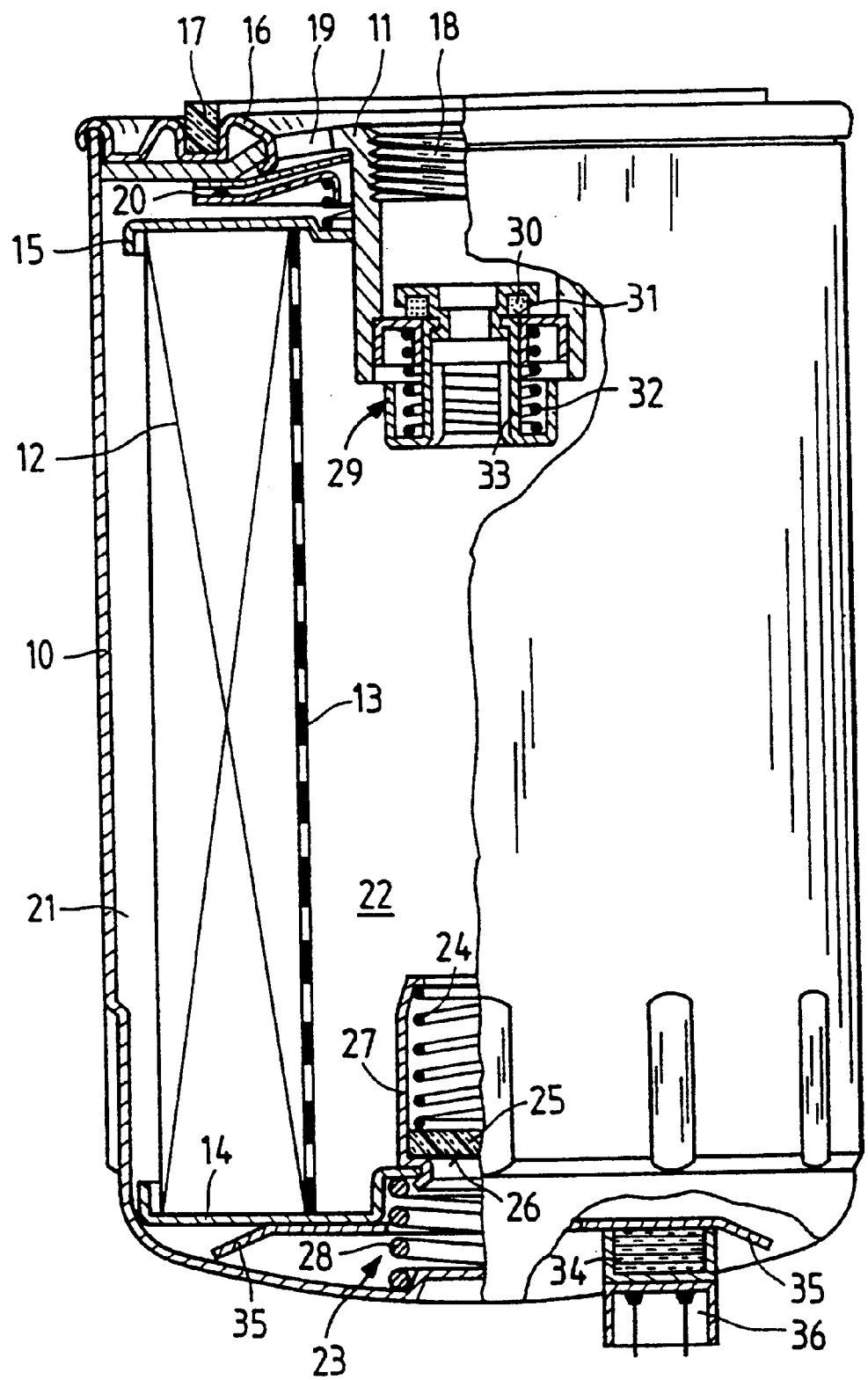
FIG. 2 shows the variants of a filter.

FIG. 2 shows a schematic illustration of a filter (with like parts being provided with like reference characters). This filter additionally comprises a heating element 34. This heating element is fastened to a metal plate, for example a copper plate 35. Heating element 34 is provided with voltage through plug connector 36. Suitable heating elements include a heating plate or a cold conductor (posistor), which below a predetermined temperature limit, heats the liquid situated in the filter.

What is claimed is:

1. A filter for lubricating oil of an internal combustion engine, said filter having an inlet opening for unfiltered liquid, an outlet opening for the filtered liquid, a filter insert, and an internal valve, wherein at least part of the valve is provided with a hydrophobic coating, wherein said valve is a pressure relief valve, wherein said hydrophobic coating includes at least one of a polytetrafluoroethylene coating and a silicone coating, wherein said valve comprises a valve member urged by a spring against a contact surface, wherein said valve member and said contact surface have an approximately linear area of contact between them, and wherein the valve includes a spring guide, and the valve is mounted to an end plate of the filter insert with the spring guide.

2. A filter according to claim 1, wherein said valve is a back-flow check valve.

3. A filter according to claim 1, wherein said filter further comprises a heating element adjacent said valve.

4. A filter according to claim 3, therein said heating element is a cold conductor.

5. A filter according to claim 3, further comprising a temperature sensor, wherein said heating element is a heating plate which is actuated by the temperature sensor.

6. A filter according to claim 3, wherein said valve member or said contact surface comprise the heating element.

7. A filter for lubricating oil of an internal combustion engine, said filter having an inlet opening for unfiltered liquid, an outlet opening for the filtered liquid, a filter insert, and an internal valve, wherein at least part of the valve is provided with a hydrophobic coating, wherein said filter further comprises a heating element adjacent said valve.

8. A filter according to claim 7, wherein said heating element is a cold conductor.

9. A filter according to claim 7, further comprising a temperature sensor, wherein said heating element is a heating plate which is actuated by the temperature sensor.

10. A filter according to claim 7, wherein said valve comprises a valve member urged by a spring against a contact surface, and wherein said valve member or said contact surface comprise the heating element.

\* \* \* \* \*